(12) United States Patent
Park et al.

(10) Patent No.: US 12,741,266 B2
(45) Date of Patent: Sep. 22, 2026

(54) VOLATILE ORGANIC COMPOUND CONDENSING SYSTEM AND METHOD FOR ENHANCING DRYING EFFICIENCY OF FILTER USING CONDENSATION HEAT OF VOC

(71) Applicant: EMSOLUTION CO., Ltd., Suwon-si (KR)

(72) Inventors: Hoon Min Park, Yongin-si (KR); Dong Hwan Jeon, Yongin-si (KR); Dal Hwan Yoon, Jecheon-si (KR); Heung Ki Min, Seongnam-si (KR)

(73) Assignee: EMSOLUTION CO., Ltd., Suwon-si (KR)

( * ) Notice: Subject to any disclaimer, the term of this patent is extended or adjusted under 35 U.S.C. 154(b) by 340 days.

(21) Appl. No.: 18/390,660

(22) Filed: Dec. 20, 2023

(65) Prior Publication Data

US 2024/0207819 A1 Jun. 27, 2024

(30) Foreign Application Priority Data

Dec. 21, 2022 (KR) ........................ 10-2022-0180710

(51) Int. Cl.
*B01D 53/04* (2006.01)
*B01J 20/34* (2006.01)

(52) U.S. Cl.
CPC ...... *B01J 20/3466* (2013.01); *B01D 53/0462* (2013.01); *B01J 20/3491* (2013.01); *B01D 2257/708* (2013.01)

(58) Field of Classification Search
CPC ................................................ B01D 53/0462
See application file for complete search history.

(56) References Cited

U.S. PATENT DOCUMENTS

2021/0187434 A1 6/2021 Gebald

FOREIGN PATENT DOCUMENTS

| | | | | | |
|---|---|---|---|---|---|
| CN | 116440651 A | * | 7/2023 | | ......... B01D 53/0462 |
| JP | 2003012568 | | 1/2003 | | |
| JP | 2013163156 A | * | 8/2013 | | |
| KR | 20130082197 | | 7/2013 | | |
| KR | 20210118897 | | 10/2021 | | |

OTHER PUBLICATIONS

Korean Office Action for Application No. 10-2022-0180710 dated Mar. 2, 2024 (7 pages).

* cited by examiner

*Primary Examiner* — Robert A Hopkins
(74) *Attorney, Agent, or Firm* — Boyle Fredrickson S.C.

(57) ABSTRACT

A volatile organic compound condensation system and method thereof for enhancing drying efficiency of a filter using VOC condensation heat including high-temperature steam condensation heat are disclosed. A volatile organic compound condensing system according to the present invention is characterized by comprising: an adsorption-desorption unit repeating an adsorption process of adsorbing volatile organic compound (VOC) from a supply gas and a desorption process of desorbing the adsorbed VOC by supplying high-temperature steam to the VOC adsorbed by the adsorption process; a condensation heat storage unit for storing VOC condensation heat being generated in the adsorption-desorption unit by using phase change material (PCM); and a drying control unit that dries the adsorption-desorption unit after the desorption process by using the condensation heat stored in the condensation heat storage unit.

8 Claims, 5 Drawing Sheets

VOLATILE ORGANIC COMPOUND CONDENSING SYSTEM AND METHOD FOR ENHANCING DRYING EFFICIENCY OF FILTER USING CONDENSATION HEAT OF VOC

CROSS REFERENCE TO RELATED APPLICATIONS

This application claims benefit of priority of Korean Patent Application No. KR 10-2022-0180710, filed on Dec. 21, 2022, the contents of which are hereby incorporated by reference.

TECHNICAL FIELD

The present invention relates to a volatile organic compound condensation system and method thereof, and more particularly, relates to a volatile organic compound condensing system and method thereof, capable of enhancing the drying efficiency of the filter after the VOC desorption process by using condensation heat of volatile organic compound (VOC), and as a result, thereby increasing the removal efficiency of VOC.

BACKGROUND ART

In general, volatile organic compounds (VOCs) are very harmful substances being generated from facilities using various organic solvents such as semiconductor facilities, petroleum refineries, petrochemical manufacturing facilities, gas stations, paint manufacturing facilities, laundry, printing and publishing facilities, road paving facilities, painting facilities, and the like. Therefore, the installation of facilities for the removal of VOCs is required in workplaces using organic solvents.

A facility for removing VOC adsorbs VOC using an adsorbent such as granular activated carbon and the adsorbed VOC is desorbed at a high concentration in the filter and then cooled to recover it in a liquid state, and such a facility is called a volatile organic compound condensing system.

At this time, the volatile organic compound condensing system generally includes two housings and two filters belonging thereto, in which an adsorption process for adsorbing VOCs is performed in one filter while a desorption process for desorbing adsorbed VOCs is performed in the other filter, and the adsorption process and the desorption process are performed alternately and repeatedly, thereby allowing the filter to be used for a long time.

However, in the desorption process of a general volatile organic compound condensing system, high-temperature steam is supplied to desorb VOC adsorbed on the filter so it often happens that some of the supplied vapor is cooled and remains in a liquid state without being completely desorbed from the filter. Such a cooling liquid has the effect of lowering the VOC adsorption efficiency so that in order to completely remove even the cooling liquid, it takes 5 to 10 minutes to dry the residue after the desorption process, thereby causing a problem in that the longer the drying time, the lower the VOC removal efficiency of the volatile organic compound condensing system.

PATENT LITERATURE

Patent Laid-open Gazette No. 10-2013-0082197 (Publication date: Jul. 19, 2013)

DETAILED DESCRIPTION OF THE INVENTION

Technical Subject

The present invention is devised for solving the above problems, an objective thereof is to improve the drying efficiency of the filter after the VOC desorption process by using VOC condensation heat, and as a result, to provide a volatile organic compound condensing system and method thereof capable of increasing the removal efficiency of VOC.

Technical Solution

A volatile organic compound condensing system according to an aspect of the present invention for achieving the above object is characterized in that it includes: an adsorption-desorption unit repeating an adsorption process of adsorbing volatile organic compound (VOC) from a supply gas and a desorption process of desorbing the adsorbed VOC by supplying high-temperature steam to the VOC adsorbed by the adsorption process; a condensation heat storage unit for storing VOC condensation heat being generated in the adsorption-desorption unit by using phase change material (PCM); and a drying control unit that dries the adsorption-desorption unit after the desorption process by using the condensation heat stored in the condensation heat storage unit.

Here, the drying control unit may include a forward drying member for drying the adsorption-desorption unit in a forward direction with respect to the desorption process.

In addition, the drying control unit may include a reverse drying member for drying the adsorption-desorption unit in a reverse direction with respect to the desorption process.

In addition, the drying control unit may include: an inflow control member for controlling an inflow amount of external air being introduced into the condensation heat storage unit; and a pressurizing member for pressurizing external air being introduced through the inflow control member.

At this time, the drying control unit sets a ratio of the time interval of the drying process to the desorption process of the adsorption-desorption unit, and may operate according to the set ratio.

A method for enhancing the drying efficiency of a volatile organic compound condensing system according to an aspect of the present invention for achieving the above object, in a drying efficiency enhancement method of the volatile organic compound condensing system including an adsorption-desorption unit that repeats an adsorption process of adsorbing volatile organic compound (VOC) from the supply gas and a desorption process of desorbing the adsorbed VOC by supplying high-temperature steam to the VOC adsorbed by the adsorption process, includes the steps of: storing condensation heat generated when the VOC is condensed in the adsorption-desorption unit by using a phase change material; and drying the adsorption-desorption unit after the desorption process by using the stored condensation heat.

Here, in the step of drying the adsorption-desorption unit, the adsorption-desorption unit may be dried in a reverse direction with respect to the desorption process.

In addition, in the step of drying the adsorption-desorption unit, the adsorption-desorption unit may also be dried in a forward direction with respect to the desorption process.

The above-described method for enhancing drying efficiency may further include steps of: controlling an inflow amount of external air; and pressurizing the introduced external air.

In addition, the above-described drying efficiency improvement method may further include a step of setting a ratio of a time interval of a drying process with respect to a desorption process of the adsorption-desorption unit.

Advantageous Effects

According to the present invention, by using VOC condensation heat to improve the drying efficiency of the filter after the VOC desorption process, it is possible to increase the VOC removal efficiency as a result.

SPECIFIC CONTENTS FOR IMPLEMENTING THE INVENTION

Figure 1:
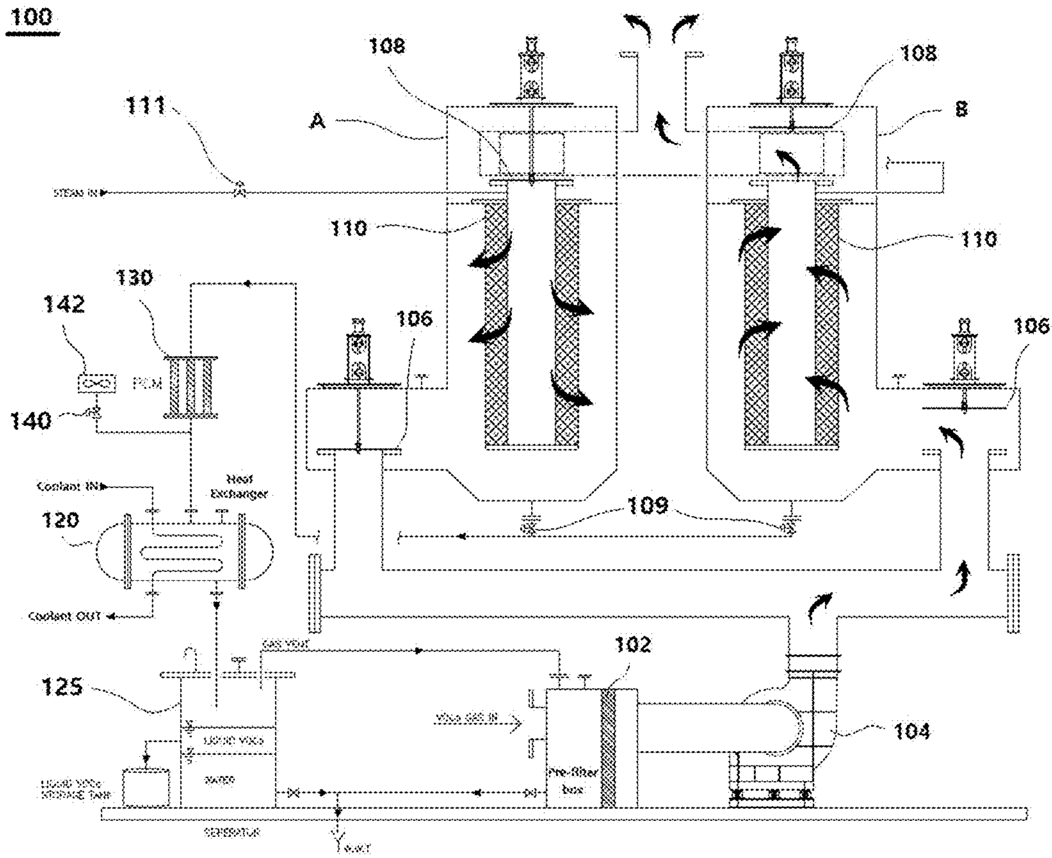
FIG. 1 is a diagram schematically illustrating a volatile organic compound condensing system according to an embodiment of the present invention.

Hereinafter, some embodiments of the present invention will be described through exemplary drawings. In describing the reference numerals to the components of each drawing, for the same components, even if they are displayed on different drawings, they are indicated with the same reference numerals as much as possible. In addition, in describing an embodiment of the present invention, if it is determined that a detailed description of a related known configuration or function hinders understanding of the embodiment of the present invention the detailed description will be omitted.

In addition, terms such as first, second, A, B, (a), and (b) may be used in describing components of an embodiment of the present invention. These terms are only used to distinguish the component from other components, and the nature, order, or sequence of the corresponding component is not limited by the term. When a component is described as being "connected", "coupled" or "interconnected" to another component, the component may be directly connected, coupled or interconnected to the other component, but it should be understood that another component may be "connected", "coupled" or "interconnected" between the component and the other component.

FIG. 1 is a diagram schematically illustrating a volatile organic compound condensing system according to an embodiment of the present invention.

Referring to FIG. 1, a volatile organic compound condensing system 100 according to an embodiment of the present invention includes: an adsorption-desorption unit 110, a heat exchange unit 120, a condensation heat storage unit 130, and drying control units 140 and 142.

The adsorption-desorption unit 110 repeatedly performs an adsorption process of adsorbing a volatile organic compound from a supply gas and a desorption process of desorbing a volatile organic compound by supplying heating gas to the volatile organic compound adsorbed by the adsorption process.

At this time, the adsorption-desorption unit 110 is provided in two A and B, and when one adsorption-desorption unit 110 performs the desorption process A the other adsorption-desorption unit 110 is implemented to perform the adsorption process B. The desorption process and the adsorption process are alternately and repeatedly performed.

Hereinafter, a VOC removal process by the volatile organic compound condensing system 100 will be described.

Contaminated gas generated in the production line is sent to a blower 104 through the pre-filter 102, and the blower 104 sends the contaminated gas passing through the pre-filter 102 to the line of the adsorption-desorption unit 110.

At this time, a line opening-closing device 106 is installed in the line of each adsorption-desorption unit 110, and opening and closing of the line is controlled depending on whether the corresponding adsorption-desorption unit 110 performs desorption process or an adsorption process.

That is, the line opening-closing device 106 on the A side responding to the desorption process closes the line directing the adsorption-desorption unit 110 on the A side, and the line opening-closing device 106 on the B side responding to the adsorption process opens the line directing the adsorption-desorption unit 110 on the B side, thereby allowing contaminated air to be introduced into the adsorption-desorption unit 110 on the B side.

Figure 2:
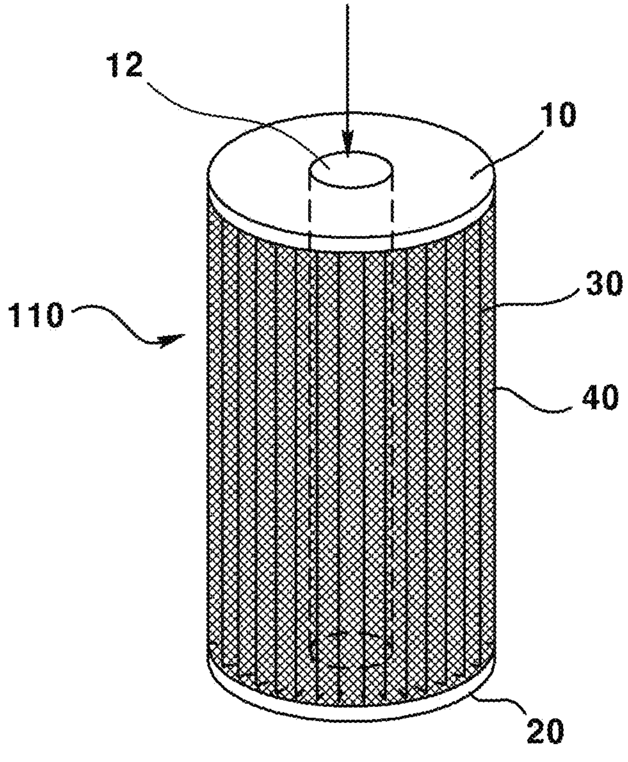
FIG. 2 is a diagram showing an example of an adsorption-desorption unit being used in the volatile organic compound condensing system of FIG. 1.

At this time, each adsorption-desorption unit 110 includes an upper plate 10, a lower plate 20, a filter 30, and a filter protection net 40, as illustrated in FIG. 2.

In the upper plate 10, a circular hole is formed in the center of a circular plate. In addition, the lower plate 20 is formed of a circular plate having the same diameter as the outer diameter of the upper plate 10. At this time, a through hole 12 being extended from the upper plate 10 to the lower plate 20 with the same diameter as the diameter of the hole of the upper plate 10 is formed, and a filter protection net 40 in the form of a net for protecting the filter 30 is installed between an outer circumference of the upper plate 10 and an outer circumference of the lower plate 20. Thus, the adsorption-desorption unit 110 has a cylindrical shape.

Figure 3:
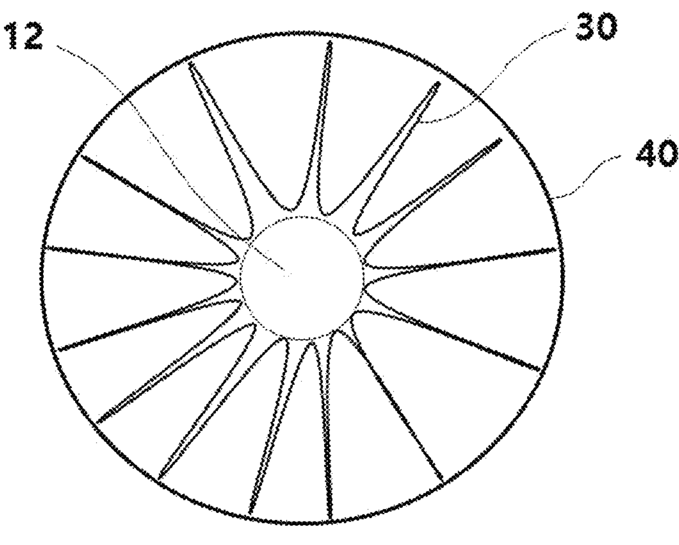
FIG. 3 is a horizontal cross-sectional view of an adsorption-desorption unit of FIG. 2.

In addition, the adsorption-desorption unit 110 enables the filters 30 to be overlapped with each other in a zigzag form between the through hole 12 and the filter protection net 40. At this time, the shape in which the filters 30 are overlapped is the same as a horizontal cross-section illustrated in FIG. 3 when viewed from above. Although the intervals between the overlapping filters are shown to be somewhat apart in order to help the understanding of the invention, the intervals between the filters may be disposed to be overlapped with each other more closely. Thus, the adsorption-desorption unit 110 allows the contaminated gas to pass through the filter protection net 40 and easily come into contact with the filters 30.

In addition, each adsorption-desorption unit 110 may include a pressurization device 108 at an upper end of each filter 30. At this time, the pressurization device 108 on the B side corresponding to the adsorption process is opened, VOCs in the contaminated gas are condensed by an adsorbent such as granular activated carbon and filtered by the filter 30, and the clean gas is discharged to the atmosphere. In this case, high-temperature steam condensation heat and VOC condensation heat are simultaneously generated during the condensation process of VOC, and the generated condensation heat is sent to the condensation heat storage unit 130 by opening the pipe valve 109 on the B side.

The condensation heat storage unit 130 stores VOC condensation heat generated in the adsorption-desorption unit 110 using a phase change material (PCM). Here, there are phase change materials that may be selected from: a paraffin wax system of any one selected from n-pentadecane, n-heptadecane, n-nonadecane, n-eicosane, n-heneicosane, n-docosane, n-tricosane, n-tetracosane, n-pentacosane, n-pentacosane, n-hexacosane, n-heptacosane, n-octacosane, n-nonacosane, n-triacontane, n-hentriacontane, n-hentriacontane, n-dotriacontane, n-tricontane; a non-paraffinic selected from acetic acid, glycerin, lithium chloride ethanolate, polyethylene glycol 600, d-lattic acid, 1-3 methyl pentacosane, camphenilone, docasyl bromide, caprylone, heptadecanone, 1-cyclohexylooctadecane, 4-heptadacanone, cyanamide, methyl eicosanate, 3-heptadecanone, 2-heptadecanone, camphene; fatty acid series selected from isopropyl stearate, caprylic acid, butyl stearate, dimethyl sabacate, myristic acid+capric, vinyl stearate, methyl palmitate, capric acid, erucic acid, lauric acid, elaidic acid, pelargoinc acid, myristic acid; salt hydrates system selected from $NaCl \cdot Na_2SO_4 \cdot 10H_2O$, $KF \cdot 4H_2O$, $K_2HO_4 \cdot 4H_2O$, $Mn(NO_3)_2 \cdot 6H_2O$, $LiBO_2 \cdot 8H_2O$, $FeBr_3 \cdot 6H_2O$, $CaCl_2 \cdot 6H_2O$, $LiNO_3 \cdot 3H_2O$, $Na_2SO_4 \cdot 10H_2O$, $Na_2CO_3 \cdot 10H_2O$, $KFe(SO_4)_2 \cdot 12H_2O$, $CaBr_2 \cdot 6H_2O$, $LiBr \cdot 2H_2O$, $Na_2HPO_4 \cdot 12H_2O$, $Zn(NO_3)_2 \cdot 6H_2O$, $Mn(NO_3)_2 \cdot 4H_2O$, $FeCl_3 \cdot 6H_2O$, $CaCl_2 \cdot 4H_2O$, $CoSO_4 \cdot 7H_2O$, $CuSO_4 \cdot 7H_2O$, $KF \cdot 2H_2O$, $MgI_2 \cdot 8H_2O$, $CaI_2 \cdot 6H_2O$, $Ca(NO_3)_2 \cdot 4H_2O$, $Zn(NO_3)_2 \cdot 4H_2O$, $K_3PO_4 \cdot 7H_2O$, $Fe(NO_3)_3 \cdot 9H_2O$, $Mg(NO_3)_3 \cdot 4H_2O$, $Na_2SiO_3 \cdot 5H_2O$, $Na_2HPO_4 \cdot 7H_2O$, $Na_2S_2O_3 \cdot 5H_2O$, $K_2HPO_4 \cdot 3H_2O$, $MgSO_4 \cdot 7H_2O$, $Ca(NO_3)_2 \cdot 3H_2O$, $Na(NO_3)_2 \cdot 6H_2O$, and the like; and eutectic-$Na_2SO_4$+NaCl+$H_2O$, $Na_2S_4$+$MgSO_4$+$H_2O$, $C_{14}H_{28}O_2$+$C_{10}H_{20}O_2$, $Ca(NO)_3 \cdot 4H_2O$+$Mg(NO)_3 \cdot 6H_2O$, $NH_2CONH_2$+$NH_4 \cdot NO_3$, $Mg(NO_3)_2 \cdot 6H_2O$+$NH_4 \cdot NO_3$.

High-temperature steam or high-temperature nitrogen gas is introduced into the adsorption-desorption unit 110 responding to the desorption process on the B side, and the pressurization device 108 on the B side supplies high-temperature steam or high-temperature nitrogen gas to the through hole 12 of the adsorption-desorption unit 110 of the cylindrical shape. Accordingly, VOCs adsorbed by the filter 30 are desorbed from the filter 30, and the desorbed VOC is firstly condensed while passing through the condensation heat storage unit 130, transferred to the heat exchanger 120, secondarily condensed by cooling water, and transferred to the separator 125 in a liquid state. At this time, in the separator 125, layer separation is performed by a difference in specific gravity in a state in which liquid water and liquid VOC are mixed, and the gaseous low-concentration VOCs transported together are sent to the pre-filter 102 to undergo the above-described process again.

At this time, in the adsorption-desorption unit 110 on the B side corresponding to the desorption process, after pressurization of hot steam or hot nitrogen, a small amount of VOC and condensed vapor remain adsorbed on the surface of the adsorption-desorption unit 110 until the adsorption-desorption unit 110 is completely dried.

Conventionally, after the desorption process, it was necessary to wait for 5 to 10 minutes until the adsorption-desorption unit 110 is completely dried, and since the longer the drying time, the lower the VOC removal efficiency of the volatile organic compound condensing system, it is necessary to dry the adsorption-desorption unit 110 after the desorption process in a shorter time.

To this end, the drying control units 140 and 142 dry the adsorption-desorption unit after the desorption process (in the case of FIG. 1, the adsorption-desorption unit 110 on the A side) using the condensation heat stored in the condensation heat storage unit 130. At this time, the drying control units 140 and 142 may include: an inflow control member 140 for controlling the inflow of external air being introduced into the condensation heat storage unit 130; and a pressurizing member 142 that pressurizes the outside air introduced through the inflow control member 140. That is, the drying control units 140 and 142 may introduce condensation heat into the adsorption-desorption unit 110 after desorption process by controlling the inflow of external air and the pressurized pressure.

At this time, the drying control units 140 and 142 set a ratio of the time interval of the drying process to the desorption process of the adsorption-desorption unit 110, and may operate according to the set ratio. For example, assuming that the ratio of the time interval of the drying process to desorption process is set to 2:1, after the desorption process takes place for 5 minutes, the drying process can introduce condensation heat to the adsorption-desorption unit 110 for 2 minutes and 30 seconds. The ratio of the time interval of the drying process to desorption process described here is an example to help the understanding of the invention, and the time interval of the drying process to the time interval of desorption process can be adjusted in various ways.

Meanwhile, the volatile organic compound condensing system 100 according to an embodiment of the present invention not only may dry the condensation heat unit 110 by introducing condensation heat in a forward direction for the desorption process but also may dry the condensation heat unit 110 by introducing the condensation heat in a reverse direction to the desorption process.

Figure 4:
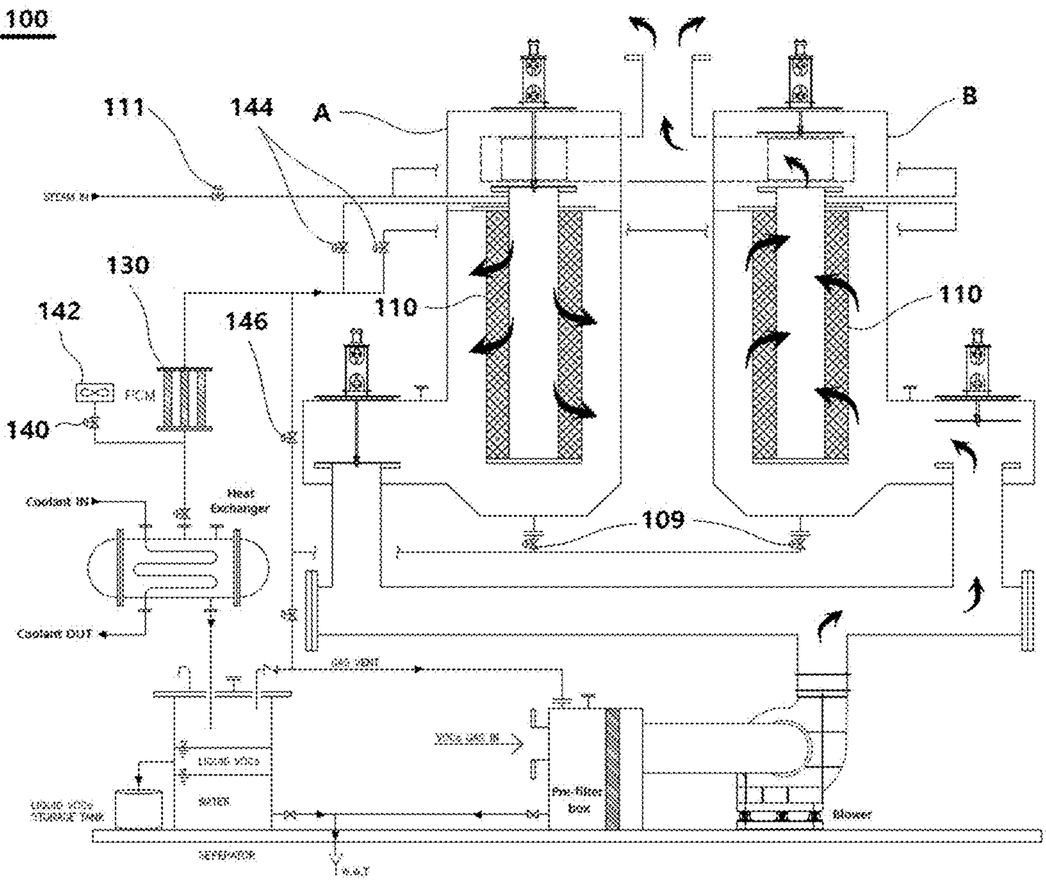
FIG. 4 is a diagram illustrating forward drying for the desorption process of the volatile organic compound condensing system of FIG. 1.

FIG. 4 is a diagram illustrating forward drying for the desorption process of the volatile organic compound condensing system of FIG. 1.

Referring to FIG. 4, the drying control units 140 and 142 may further include a forward drying member 144 in addition to the inflow control member 140 and the pressurizing member 142.

At this time, the forward drying member 144 is installed in the form of a valve on the pipe connected to an upper end of the adsorption-desorption unit 110 on the A side and the adsorption-desorption unit 110 on the B side, respectively, and introduce condensation heat into the adsorption-desorption unit 110 after the desorption process in the same direction as the direction of the desorption process. At this time, the pressurization device 108 is opened after the desorption process, and it is preferable that the condensation heat being introduced is introduced into the through hole 12 of the adsorption-desorption unit 110. That is, in FIG. 1, the adsorption-desorption unit 110 on the A side opens the pressurization device 108 after the desorption process, and the dries the filter 30 by heating the inside of the through hole 12 of the adsorption-desorption unit 110.

Through this, the volatile organic compound condensing system according to an embodiment of the present invention can shorten the drying time of the filter after the desorption process, and as a result, the VOC removal efficiency of the volatile organic compound condensing system can be enhanced.

Figure 5:
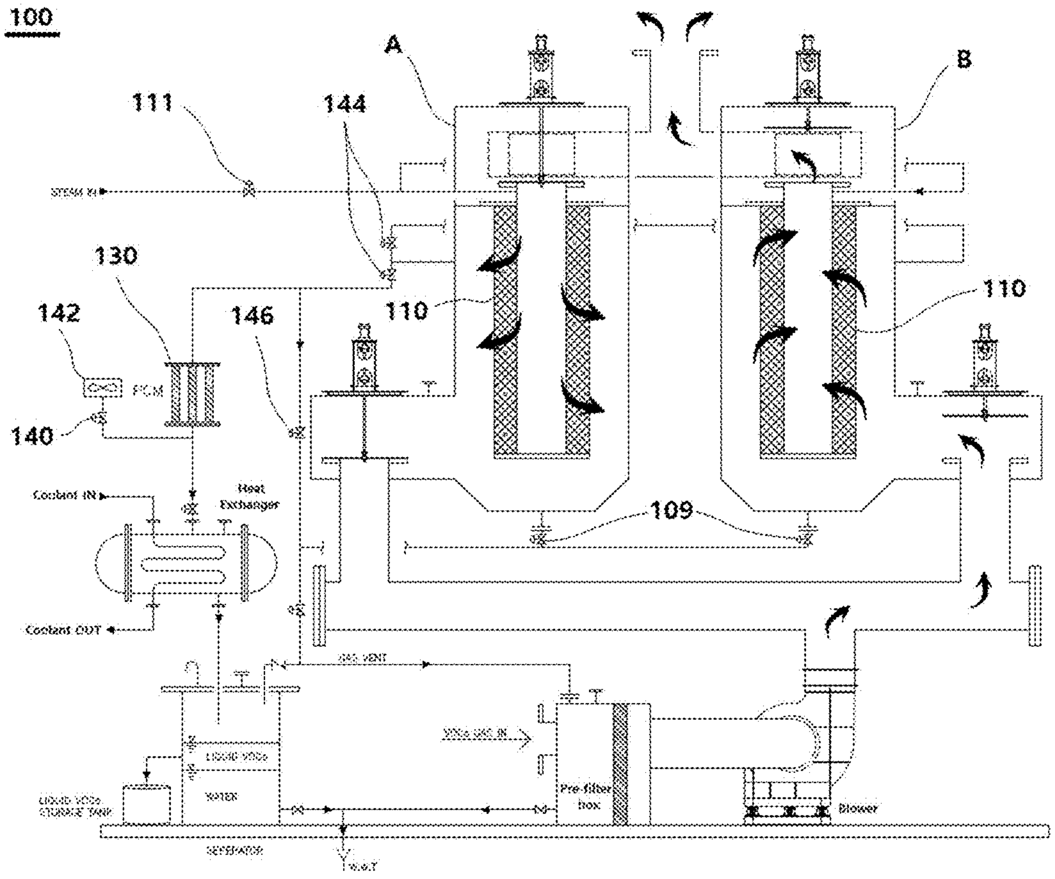
FIG. 5 is a diagram illustrating reverse drying of the desorption process of the volatile organic compound condensing system of FIG. 1.

FIG. 5 is a diagram illustrating reverse drying of the desorption process of the volatile organic compound condensing system of FIG. 1.

Referring to FIG. 5, the drying control units 140 and 142 may further include a reverse drying member 146 in addition to the inflow control member 140 and the pressurizing member 142.

At this time, the reverse drying member 146 is installed in the form of a valve on the pipe connected to a lower end of the adsorption-desorption unit 110 on the A side and the adsorption-desorption unit 110 on the B side, respectively, and introduces condensation heat into the adsorption-desorption unit 110 after the desorption process in an opposite direction to the direction of the desorption process. At this time, reverse drying may proceed even during the desorption process, and accordingly, the time of the drying process can be further shortened than forward drying.

That is, forward drying should be performed after the desorption process by opening the pressurization device 108 again, but on the other hand, in reverse drying, the desorption process is started and high-temperature steam or high-temperature nitrogen gas is pressurized by the pressurization device 108, and then, even before the pressurization device 108 is opened condensation heat is introduced to the lower end of the adsorption-desorption unit 110 where the desorption process has been performed, thereby drying the filter 30 on the outer surface of the adsorption-desorption unit 110.

Through this, the volatile organic compound condensing system according to an embodiment of the present invention can shorten the drying time of the filter after the desorption process, and as a result, the VOC removal efficiency of the volatile organic compound condensing system can be enhanced.

Here, forward drying and reverse drying are separately illustrated and described as separate drying processes, but forward drying and reverse drying may be performed simultaneously. That is, the volatile organic compound condensing system according to an embodiment of the present invention may perform the drying process simultaneously on both the inner and outer side surfaces of the adsorption-desorption unit 110 by introducing condensation heat is introduced to an upper end and a lower end of the adsorption-desorption unit 110 at the same time on the adsorption-desorption unit 110 in which the desorption process has been performed.

Figure 6:
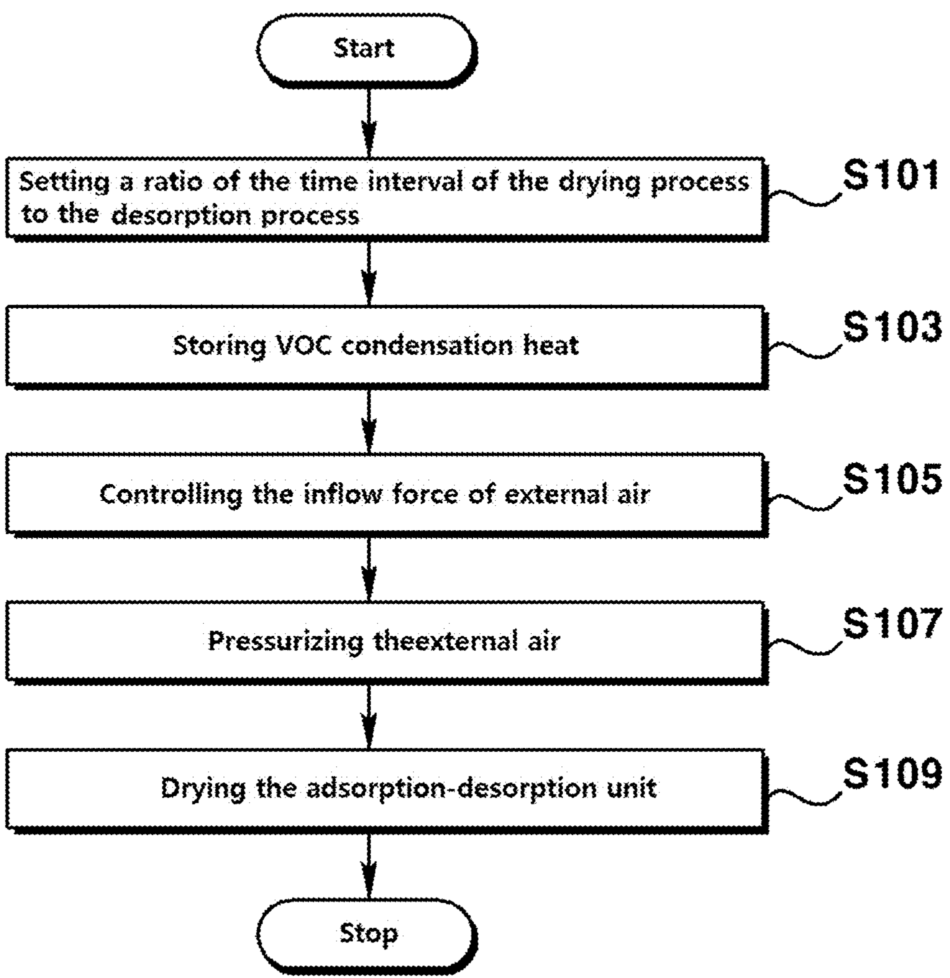
FIG. 6 is a flowchart illustrating a method for enhancing drying efficiency of a volatile organic compound condensing system according to an embodiment of the present invention.

FIG. 6 is a flowchart illustrating a method for enhancing drying efficiency of a volatile organic compound condensing system according to an embodiment of the present invention. The drying efficiency enhancement method according to an embodiment of the present invention may be performed by the volatile organic compound condensing system 100 shown in FIGS. 1 to 5.

Referring to FIGS. 1 to 6, the volatile organic compound condensing system 100 according to an embodiment of the present invention sets a ratio of the time interval of the drying process to the desorption process of the adsorption-desorption unit 110 of the drying control units 140 and 142 (S101). For example, in the volatile organic compound condensing system 100, the ratio of the time interval of the drying process to that of the desorption process can be set to 2:1, which means that after the desorption process is performed for 5 minutes, the drying process can introduce condensation heat into the corresponding adsorption-desorption unit 110 for 2 minutes and 30 seconds. The ratio of the time interval of the drying process to that of the desorption process described here is an example to help the understanding of the invention, and of course, the time interval of the drying process to the time interval of desorption process can be set in various ways.

The adsorption-desorption unit 110 repeatedly performs an adsorption process of adsorbing a volatile organic compound from a supply gas and a desorption process of desorbing a volatile organic compound by supplying heating gas to the volatile organic compound adsorbed by the adsorption process.

At this time, the adsorption-desorption unit 110 is provided in two A and B, and when one adsorption-desorption unit 110 performs the desorption process A the other adsorption-desorption unit 110 is implemented to perform the adsorption process B. The desorption process and the adsorption process are alternately and repeatedly performed.

The condensation heat storage unit 130 stores VOC condensation heat generated in the adsorption-desorption unit 110 using a phase change material (PCM) (S103). At this time, VOC condensation heat may occur in the process of condensation of VOC being adsorbed on the adsorbent in the adsorption process. Here, there are phase change materials that may be selected from: a paraffin wax system of any one selected from n-pentadecane, n-heptadecane, n-nonadecane, n-eicosane, n-heneicosane, n-docosane, n-tricosane, n-tetracosane, n-pentacosane, n-pentacosane, n-hexacosane, n-heptacosane, n-octacosane, n-nonacosane, n-triacontane, n-hentriacontane, n-hentriacontane, n-dotriacontane, n-tricontane; a non-paraffinic selected from acetic acid, glycerin, lithium chloride ethanolate, polyethylene glycol 600, d-lattic acid, 1-3 methyl pentacosane, camphenilone, docasyl bromide, caprylone, heptadecanone, 1-cyclohexylooctadecane, 4-heptadacanone, cyanamide, methyl eicosanate, 3-heptadecanone, 2-heptadecanone, camphene; fatty acid series selected from isopropyl stearate, caprylic acid, butyl stearate, dimethyl sabacate, myristic acid+capric, vinyl stearate, methyl palmitate, capric acid, erucic acid, lauric acid, elaidic acid, pelargoinc acid, myristic acid; salt hydrates system selected from $NaCl \cdot Na_2SO_4 \cdot 10H_2O$, $KF \cdot 4H_2O$, $K_2HO_4 \cdot 4H_2O$, $Mn(NO_3)_2 \cdot 6H_2O$, $LiBO_2 \cdot 8H_2O$, $FeBr_3 \cdot 6H_2O$, $CaCl_2 \cdot 6H_2O$, $LiNO_3 \cdot 3H_2O$, $Na_2SO_4 \cdot 10H_2O$, $Na_2CO_3 \cdot 10H_2O$, $KFe(SO_4)_2 \cdot 12H_2O$, $CaBr_2 \cdot 6H_2O$, $LiBr \cdot 2H_2O$, $Na_2HPO_4 \cdot 12H_2O$, $Zn(NO_3)_2 \cdot 6H_2O$, $Mn(NO_3)_2 \cdot 4H_2O$, $FeCl_3 \cdot 6H_2O$, $CaCl_2 \cdot 4H_2O$, $CoSO_4 \cdot 7H_2O$, $CuSO_4 \cdot 7H_2O$, $KF \cdot 2H_2O$, $MgI_2 \cdot 8H_2O$, $CaI_2 \cdot 6H_2O$, $Ca(NO_3)_2 \cdot 4H_2O$, $Zn(NO_3)_2 \cdot 4H_2O$, $K_3PO_4 \cdot 7H_2O$, $Fe(NO_3)_3 \cdot 9H_2O$, $Mg(NO_3)_3 \cdot 4H_2O$, $Na_2SiO_3 \cdot 5H_2O$, $Na_2HPO_4 \cdot 7H_2O$, $Na_2S_2O_3 \cdot 5H_2O$, $K_2HPO_4 \cdot 3H_2O$, $MgSO_4 \cdot 7H_2O$, $Ca(NO_3)_2 \cdot 3H_2O$, $Na(NO_3)_2 \cdot 6H_2O$, and the like; and eutectic-$Na_2SO_4$+$NaCl$+$H_2O$, $Na_2S_4$+$MgSO_4$+$H_2O$, $C_{14}H_{28}O_2$+$C_{10}H_{20}O_2$, $Ca(NO)_3 \cdot 4H_2O$+$Mg(NO)_3 \cdot 6H_2O$, $NH_2CONH_2$+$NH_4 \cdot NO_3$, $Mg(NO_3)_2 \cdot 6H_2O$+$NH_4 \cdot NO_3$.

The volatile organic compound condensing system 100 introduces high-temperature steam or high-temperature nitrogen gas into the adsorption-desorption unit 110 corresponding to the desorption process, and the pressurization device 108 corresponding to the adsorption-desorption unit 110 pressurizes high-temperature steam or high-temperature nitrogen gas through the through hole 12 of the adsorption-desorption unit 110. Accordingly, VOCs adsorbed by the filter 30 are desorbed from the filter 30, and the desorbed VOC is firstly condensed while passing through the condensation heat storage unit 130, transferred to the heat exchanger 120, secondarily condensed by cooling water, and transferred to the separator 125 in a liquid state.

At this time, in the adsorption-desorption unit 110 corresponding to the desorption process, after pressurization of hot steam or hot nitrogen, a small amount of VOC and condensed vapor remain adsorbed on the surface of the adsorption-desorption unit 110 until the adsorption-desorption unit 110 is completely dried.

The volatile organic compound condensing system 100 according to an embodiment of the present invention dries the adsorption-desorption unit after the desorption process (in the case of FIG. 1, the adsorption-desorption unit 110 on the A side) by using the condensation heat stored in the condensation heat storage unit 130. At this time, the volatile organic compound condensing system 100 controls the inflow force of external air being introduced into the condensation heat storage unit 130 (S105), and may pressurize an external air being introduced to introduce it into the adsorption-desorption unit 110 corresponding to the desorption process by pressurizing the external air being introduced(S107).

Meanwhile, the volatile organic compound condensing system 100 according to an embodiment of the present invention not only may dry the condensation heat unit 110 by introducing condensation heat in a forward direction for the desorption process but also may dry the condensation heat unit 110 by introducing the condensation heat in a reverse direction to the desorption process.

That is, the volatile organic compound condensing system 100 may introduce condensation heat into the adsorption-desorption unit 110 after the desorption process in the same direction as the direction of the desorption process by using the forward drying members 144 each installed in the form of a valve on the pipe connected to upper ends of the adsorption-desorption unit 110 on the A side and the adsorption-desorption unit 110 on the B side. At this time, it is preferable that the pressurization device 108 after the desorption process is opened, and the condensation heat being introduced is introduced into the through hole 12 of the adsorption-desorption unit 110.

Through this, the volatile organic compound condensing system according to an embodiment of the present invention can shorten the drying time of the filter after the desorption process, and as a result, the VOC removal efficiency of the volatile organic compound condensing system can be enhanced.

In addition, the volatile organic compound condensing system 100 may introduce condensation heat into the adsorption-desorption unit 110 after the desorption process in an opposite direction to the direction of the desorption process by using the reverse drying member 146 installed in the form of a valve on the pipe connected to lower ends of the adsorption-desorption unit 110 on the A side and the adsorption-desorption unit 110 on the B side, respectively. At this time, reverse drying may proceed even during the desorption process, and accordingly, the time of the drying process can be further shortened than forward drying.

That is, forward drying should be performed after the desorption process by opening the pressurization device 108 again, but on the other hand, in reverse drying, the desorption process is started and high-temperature steam or high-temperature nitrogen gas is pressurized by the pressurization device 108, and then, even before the pressurization device 108 is opened condensation heat is introduced to the lower end of the adsorption-desorption unit 110 where the desorption process has been performed, thereby drying the filter 30 on the outer surface of the adsorption-desorption unit 110.

Through this, the volatile organic compound condensing system according to an embodiment of the present invention can shorten the drying time of the filter after the desorption process, and as a result, the VOC removal efficiency of the volatile organic compound condensing system can be enhanced.

Here, forward drying and reverse drying are separately illustrated and described as separate drying processes, but forward drying and reverse drying may be performed simultaneously. That is, the volatile organic compound condensing system according to an embodiment of the present invention may perform the drying process simultaneously on both the inner and outer side surfaces of the adsorption-desorption unit 110 by introducing condensation heat is introduced to an upper end and a lower end of the adsorption-desorption unit 110 at the same time on the adsorption-desorption unit 110 in which the desorption process has been performed.

The volatile organic compound condensing system 100 dries the adsorption-desorption unit 110 by using condensation heat being introduced in at least one of the upper end and lower end of the adsorption-desorption unit 110 (S109).

At this time, the volatile organic compound condensing system according to an embodiment of the present invention can shorten the drying time of the conventional filter by drying the filter after the desorption process using VOC condensation heat, and as a result, the VOC removal efficiency of the volatile organic compound condensing system can be enhanced.

Although the embodiments according to the present invention have been described above, this is merely illustrative, and those skilled in the art will understand that various modifications and equivalent embodiments are possible therefrom. Therefore, the protection scope of the present invention should be defined by the following claims as well as equivalents thereto.

We claim:

1. A volatile organic compound condensing system that enhances drying efficiency by using VOC condensation heat including high-temperature steam condensation heat comprising:

an adsorption-desorption unit repeating an adsorption process of adsorbing volatile organic compound (VOC) from a supply gas and a desorption process of desorbing the adsorbed VOC by supplying high-temperature steam to the VOC adsorbed by the adsorption process;

a condensation heat storage unit for storing VOC condensation heat being generated in the adsorption-desorption unit by using phase change material (PCM); and a drying control unit that dries the adsorption-desorption unit after the desorption process by using the condensation heat stored in the condensation heat storage unit, and wherein the drying control unit sets a ratio of a time interval of a drying process to the desorption process of the adsorption-desorption unit, and operates according to the set ratio.

2. The volatile organic compound condensing system that enhances drying efficiency by using VOC condensation heat including high-temperature steam condensation heat according to claim 1, wherein the drying control unit includes a forward drying member for drying the adsorption-desorption unit in a forward direction with respect to the desorption process.

3. The volatile organic compound condensing system that enhances drying efficiency by using VOC condensation heat including high-temperature steam condensation heat according to claim 1, wherein the drying control unit includes a reverse drying member for drying the adsorption-desorption unit in a reverse direction with respect to the desorption process.

4. The volatile organic compound condensing system that enhances drying efficiency by using VOC condensation heat including high-temperature steam condensation heat according to claim 1, wherein the drying control unit includes:

an inflow control member for controlling an inflow amount of external air being introduced into the condensation heat storage unit; and a pressurizing member for pressurizing external air being introduced through the inflow control member.

5. A method for enhancing the drying efficiency of a volatile organic compound condensing system, in a drying efficiency enhancement method of the volatile organic compound condensing system including an adsorption-desorption unit that repeats an adsorption process of adsorbing volatile organic compound (VOC) from the supply gas and a desorption process of desorbing the adsorbed VOC by supplying high-temperature steam to the VOC adsorbed by the adsorption, comprising the steps of:

setting a ratio of a time interval of a drying process with respect to a desorption process of the adsorption-desorption unit;

storing condensation heat generated when the VOC is condensed in the adsorption-desorption unit by using a phase change material; and drying the adsorption-desorption unit after the desorption process by using the stored condensation heat.

6. The method for enhancing the drying efficiency according to claim 5, wherein the step of drying the adsorption-desorption unit dries the adsorption-desorption unit in a reverse direction with respect to the desorption process.

7. The method for enhancing the drying efficiency according to claim 5, wherein the step of drying the adsorption-desorption unit dries the adsorption-desorption unit in a forward direction with respect to the desorption process.

8. The method for enhancing the drying efficiency according to claim 5, further including steps of:

controlling an inflow amount of external air; and pressurizing the external air being introduced.

* * * * *